United States Patent Office 3,799,899
Patented Mar. 26, 1974

3,799,899
TWO-STEP POLYMERIZATION OF LAURYL-LACTAM WITHOUT MINERAL ACID CATALYSTS
Roland Feinauer and Karl-Adolf Muller, Marl, Germany, assignors to Chemische Werke Huls Aktiengesellschaft, Marl, Germany
No Drawing. Filed Oct. 11, 1972, Ser. No. 296,527
Claims priority, application Germany, Oct. 20, 1971, P 21 52 194.8
Int. Cl. C08g 20/10
U.S. Cl. 260—18 N               6 Claims

ABSTRACT OF THE DISCLOSURE

A process for the two-step polymerization of lauryllactam without mineral acid catalysts and optionally in the presence of monocarboxylic acids or polycarboxylic acids as chain regulators wherein the first step is carried out at a temperature of about 270–290° C. in the presence of water, under superatmospheric pressure and after the removal of water the second step is carried out at a temperature of about 240–265° C., which is lower than the temperature of the first step.

BACKGROUND OF THE INVENTION

The field of the invention is synthetic resin polymerization and the present invention is particularly concerned with the polymerization of lauryllactam at elevated temperatures in the presence of water, without the use of mineral acid catalyst but optionally in the presence of mono- or polycarboxylic acids as chain regulators, wherein, in a first stage, a preliminary polymerization is conducted under pressure and, after removal of the water, in a second stage, a post polymerization is carried out.

The state of the prior art of the two-step polymerization of epsilon caprolactam (nylon-6) and lauryllactam (nylon-12) may be ascertained by reference to the Kirk-Othmer "Encyclopedia of Chemical Technology," vol. 16 (1968), pages 89, 92, and 100; U.S. Pat. 2,241,322 of Hanford; German published applications 1,495,147; 1,520,551 and 1,907,032 and French Pats. 1,380,330; 1,401,842 and 1,413,397. The disclosures of these prior art references are incorporated herein.

It is conventional in the production of polyamides to effect a preliminary polymerization in the presence of water and optionally in the presence of chain regulators, in a first stage, under pressure at a temperature of between 180° and 300° C. and, after removal of the water, to conduct a post polymerization in a second stage within the same temperature range. Such a process is disclosed in U.S. Pat. 2,241,322 of Hanford wherein epsilon-caprolactam is heated in the presence of 0.1 molecular equivalent of water.

It is likewise known to apply this conventional procedure to the polymerization of lauryllactam, the process being effected, in a first stage, at between 200° and 340° C. and, in a second stage, at between 270° and 340° C. This is disclosed in German published application 1,495,149 and French Pat. 1,413,397. It can be seen from these references that the post polymerization of the lauryllactam at below 290° C. leads to commercially useless products with a high monomer proportion.

It is further known to the art to conduct the polymerization of lauryllactam in the presence of strong mineral acid type catalysts such as phosphoric acid, phosphorous acid, or sulfonic acids at temperatures of between 280° and 300° C. in a single stage, as disclosed in German unexamined published applications 1,520,551; 1,907,032 and 1,495,147 or to carry out a first polymerization at temperatures of above 300° C. and then to conduct a post condensation at temperatures below the melting point of the polylauryllactam, as disclosed in German published application 1,267,428. However, working with such strong acidic catalysts results in the disadvantage that the polylauryllactams prepared are subjected to an increased hydrolytic degradation during their processing because the catalysts employed remain in the polymer.

Accordingly, the state of the art requires the use of strongly acidic catalysts in order to carry out the post condensation at substantially lower temperatures, and this results in products which are particularly exposed to hydrolytic degradation. The polymerization reactors are additionally exposed to increased corrosion when this method is used.

When the polymerization method is carried out in the presence of water, it is necessary to operate at least at temperaures of about 290° C. during the post condensation in order to keep the extract proportion low. In this process, however, the so-called content of fisheye gels is increased to an undesired extent, so that the products obtained are not sufficiently usable for the manufacture of fibers, monofilaments and particularly films.

SUMMARY OF THE INVENTION

It has been found that, contrary to the previous teaching of the state of the art, these disadvantages are avoided by conducting in a first stage, a preliminary polymerization of the lauryllactam at a temperature of about 265–320° C. and effecting a post polymerization at a temperature of about 220–265° C. which is lower than in the first stage.

The polylauryllactam thus prepared surprisingly exhibits a low extract content and a substantially improved lower fisheye gel content.

In accordance with the process of the present invention, lauryllactam is heated in a mixture with about 0.5–50 percent by weight, preferably 1–10 percent by weight, of water, based on the amount by weight of lauryllactam, in conventional pressure vessels for about 2–20 hours, preferably 5–10 hours, to about 265–320° C., preferably 270–290° C. During this process, an internal pressure of up to about 70 atmospheres gauge is attained in the reactor in dependence on the temperature, the amount of water added, and the free gas volume. Advantageously, the procedure is carried out at internal pressures of about 10–30 atmospheres gauge. Suitably, an inert atmosphere as provided by a protective gas, such as nitrogen, is used in the process.

After this preliminary polymerization, the water is removed by expansion. Thereafter, a post polymerization is conducted at about 220–265° C., preferably at 240–265° C. under a stream of a protective gas, for example nitrogen, until the desired viscosity has been attained, for example for a period of about 0.5 to 10 hours under atmospheric pressure.

DESCRIPTION OF THE PREFERRED EMBODIMENTS

The post polymerization can be conducted in the same pressure vessel, within the range of the temperature limits of this invention, for example at a temperature which has been lowered by cooling. However, the preliminary polymerizate can also be subjected to post condensation in another conventional vessel after having been pumped into the latter.

In order to regulate the molecular weight, it is possible to add to the lauryllactam, prior to or during the polymerization, the usual chain regulators, such as monocarboxylic acids having 2 to 18 carbon atoms or polycarboxylic acids having 2 to 12 carbon atoms, particularly dicarboxylic acids having 2 to 12 carbon atoms, in amounts of about 0.05–2 molar percent, preferably 0.1–0.5 molar percent. Examples of carboxylic acids which can be used are acetic acid, propionic acid, stearic acid, adipic acid, sebacic acid, azelaic acid, or decanedicarboxylic acid, especally adipic acid and sebacic acid.

The first stage of the process is carried out under an inert atomsphere and at a temperature of about 265–320° C., a pressure of about 10 to 70 atmospheres and for a period of 2 to 20 hours, or until a relative viscosity of about 1.05 to 1.30 is reached as measured by German Industrial Standard DIN 53 727. The volume ratio of lactam melt and water to gaseous space varies from 9:1 to 1:9.

The second stage of the process is carried out under an inert atmosphere, at atmospheric pressure, at a temperature of about 220–265° C., and for a period of 0.1 to 20 hours, or until a relative viscosity of about 1.30 to 2.50 is reached as measured by German Industrial Standard DIN 53 727.

Specific embodiments of the present invention are shown in the following examples.

EXAMPLE 1

In a closed pressure vessel, a mixture of 100 parts of lauryllactam, 3 parts of water, and 0.2 part of adipic acid is heated under nitrogen for 9 hours to 275° C. During this process, an internal pressure of 16–20 atm. gauge is obtained (the volume ratio of the lactam melt—water mixture to the volume of gaseous space is about 1:1). Thereafter, the mixture is subjected to gradual expansion, the water being practically completely removed thereby. After expansion, a post polymerization is conducted under atmospheric pressure for about 0.5 hour at 255° C., with a nitrogen stream passing over the polymer melt. In order to determine the amount of fisheye gels in the product, blown films were produced as disclosed i.e. in "Kunststofftechnik 9 (1970) pp. 386f." Fisheye gels are very small crosslinked, insoluble particles, which give the films a bad look, especially by printing on them.

EXAMPLE 2

In a closed pressure vessel, a mixture of 100 parts of lauryllactam, 3 parts of water, and 0.2 part of adipic acid is heated under nitrogen for 9 hours to 280° C. During this step, an internal pressure of 16–20 atm. gauge is obtained (the volume ratio of lactam melt—water to the volume of gaseous space is about 1:1). Thereafter, a gradual expansion is conducted, during which step the water is removed almost entirely. After expansion, a post polymerization is effected under atmospheric pressure for 0.5 hour at 265° C. while a nitrogen stream is passed over the polymer melt. In order to determine the amount of fisheye gels, blown films were produced.

EXAMPLE 3

In a closed pressure vessel, a mixture of 100 parts of lauryllactam, 3 parts of water, and 0.2 part of adipic acid is heated under nitrogen for 9 hours to 270° C. During this procedure, an internal pressure of 16–20 atm. gauge is obtained (the volume ratio of lactam melt—water to the volume of gaseous space is about 1:1). Thereafter, a gradual expansion is carried out, during which step the water is almost completely removed. After expansion, a post polymerization is conducted under atmospheric pressure for 0.5 hour at 240° C. while a nitrogen stream is conducted over the polymer melt. In order to determine the extent of fisheye gels, blown films were manufactured.

EXAMPLE 4

In a closed pressure vessel, a mixture of 100 parts of lauryllactam, 3 parts of water, and 0.35 percent adipic acid is heated under nitrogen for 12 hours to 275° C. During this procedure, an internal pressure of 16–20 atm. gauge is obtained (the volume ratio of lactam melt—water to the volume of gaseous space is approximately 1:1). Thereafter, a gradual expansion is effected, during which process the water is removed almost completely. After expansion, a post polymerization step is carried out under atmospheric pressure for 1 hour at 260° C. while exposing the polymer melt to a nitrogen stream. For a determination of the fisheye gels, blown films were prepared.

EXAMPLE 5

In a closed pressure vessel, a mixture of 100 parts of lauryllactam and 3 parts of water is heated under nitrogen for 6 hours to 280° C. During this step, an internal pressure of 16–20 atm. gauge is obtained (the volume ratio of lactam melt—water to the volume of gaseous space is about 1:1). Thereafter, the mixture is gradually expanded, during which procedure the water is removed almost entirely. After expansion, a post polymerization is effected under atmospheric pressure at 260° C. for 0.5 hour while a nitrogen stream is passed over the polymer melt. For determining the fisheye gel content, blown films were produced.

EXAMPLE 6

Example 1 was repeated without the addition of 0.2 part of adipic acid. For determining the fisheye gel content, blown films were produced.

COMPARATIVE EXAMPLES

Under the conditions indicated in the table set forth below, reactions were conducted analogously to Examples 1–3 at the temperatures and for the periods of time listed in the table.

In the table, in order to demonstrate the advance in the art, the properties are compiled which are exhibited by the products obtained according to the process of the present invention as compared to those exhibited by products prepared according to the process of the prior art.

The table shows that, according to the process of the present invention, high molecular products are obtained with a low extract content and displaying excellent fisheye gel values. In contrast thereto, the products obtained according to the process of German published application 1,495,149 exhibit poor fisheye gel values. In order to evaluate the content of fisheye gels, films were produced from the polylauryllactam, and the fisheye gels clearly visible in the films were evaluated in accordance with the following subjective evaluating code:

Fisheye gel evaluation

Value 1: No fisheye gel.
Value 2: Very few and only very small fisheye gel; not troublesome.
Value 3: Many, and also larger, fisheye gels; very troublesome.

The relative solution viscosity was measured at 25° C. in m-cresol at a concentration of 0.5 g./100 ml. according to German Industrial Standard DIN 53 727.

The extract content was determined by extraction with boiling methanol in a Soxhlet apparatus.

| | Preliminary polymerization | | Post polymerization | | Relative viscosity | Extract (percent by weight) | Fisheye gel value |
|---|---|---|---|---|---|---|---|
| | Temp., °C. | Period, hours | Temp., °C. | Period, hours | | | |
| Example: | | | | | | | |
| 1 | 275 | 9 | 255 | 0.5 | 1.84 | 1.2 | 2 |
| 2 | 280 | 9 | 265 | 0.5 | 1.84 | 1.1 | 2 |
| 3 | 270 | 9 | 240 | 0.5 | 1.88 | 1.1 | 2 |
| 4 | 275 | 12 | 260 | 1 | 1.61 | 1.1 | 2 |
| 5 | 280 | 6 | 265 | 0.5 | 1.95 | 1.5 | 2 |
| 6 | 275 | 9 | 255 | 0.5 | 1.95 | 1.1 | 2 |
| Comparative Example: | | | | | | | |
| 1 | 295 | 3 | 290 | 3 | 1.78 | 1.2 | 3 |
| 2 | 295 | 2 | 300 | 3 | 1.73 | 1.3 | 3 |
| 3 | 290 | 2 | 290 | 2.5 | 1.74 | 1.3 | 3 |

We claim:

1. In the process for preparing polyamides which comprises heating lauryllactam as an initial polyamide-forming reactant under superatmospheric pressure with water in an amount of at least 0.1 mole of water per mole of the lauryllactam, and continuing said heating under superatmospheric pressure with retention of said amount of water until the lauryllactam has been converted mostly to polylauryllactam, the improvement comprising conducting a two-step polymerization without mineral acid catalysts wherein the first step is carried out at a temperature of about 270–290° C., removing the water, and the second step is a post polymerization at a temperature of about 240–265° C. under atmospheric pressure.

2. A process for the two-step polymerization of lauryllactam without mineral acid catalysts comprising:
   carrying out a first step by heating lauryllactam monomer at a temperature of about 270–290° C. and under superatmospheric pressure for about 2–20 hours in the presence of about 0.5–50 percent by weight water:
   removing said water by expansion; and
   carrying out a postpolymerization at a temperature of about 240–265° C. under atmospheric pressure and a stream of protective gas for about 0.5 to 10 hours.

3. The process of claim 2, wherein said superatmospheric pressure is about 10–30 atmospheres gauge.

4. The process of claim 3, wherein said time of heating for said first step is about 5–10 hourus.

5. The process of claim 1, wherein the first step and post polymerization are conducted in the presence of a chain regulator selected from the group consisting of monocarboxylic acids having 2–18 carbon atoms and dicarboxylic acids having 2–12 carbon atoms, said chain regulator having a concentration of about 0.05–2 molar percent.

6. The process of claim 2, wherein the first step and post polymerization are conducted in the presence of a chain regulator having a concentration of about 0.1–0.5 molar percent and said chain regulator is selected from the group consisting of acetic acid, propionic acid, stearic acid, adipic acid, sebacic acid, azelaic acid or decanedicarboxylic acid.

References Cited
UNITED STATES PATENTS

| | | | |
|---|---|---|---|
| 3,458,482 | 7/1969 | Goto et al. | 260—78 |
| 2,241,322 | 5/1941 | Hanford | 260—78 |
| 3,171,829 | 3/1965 | Wiesner et al. | 260—78 |
| 3,564,599 | 2/1971 | Schaaf et al. | 260—78 |
| 3,410,832 | 11/1968 | Griehl et al. | 260—78 |
| 3,317,482 | 5/1967 | Kunde et al. | 260—78 |

DONALD E. CZAJA, Primary Examiner

E. C. RZUCIDLO, Assistant Examiner

U.S. Cl. X.R.

260—78 L